United States Patent
Gallert et al.

(10) Patent No.: US 9,154,019 B2
(45) Date of Patent: Oct. 6, 2015

(54) ROTOR HUB ASSEMBLY WITH NON-MAGNETIC RESOLVER SHIELDING RING

(75) Inventors: Brian Gallert, Royal Oak, MI (US);
Khwaja M. Rahman, Troy, MI (US);
Matthew D. Laba, Oakland, MI (US);
Paul F. Turnbull, Canton, MI (US);
Brian Schulze, Ortonville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 581 days.

(21) Appl. No.: 13/494,163

(22) Filed: Jun. 12, 2012

(65) Prior Publication Data
US 2013/0328454 A1    Dec. 12, 2013

(51) Int. Cl.
*H02K 11/00* (2006.01)

(52) U.S. Cl.
CPC ........ *H02K 11/0005* (2013.01); *H02K 11/0031* (2013.01)

(58) Field of Classification Search
CPC ....................... H02K 11/0005; H02K 11/0031
USPC .......................................... 310/68 B; 318/830
See application file for complete search history.

(56) References Cited

U.S. PATENT DOCUMENTS

| | | | |
|---|---|---|---|
| 5,150,282 A * | 9/1992 | Tomura et al. | 361/818 |
| 6,252,159 B1 * | 6/2001 | Anagnos | 174/377 |
| 7,268,451 B2 | 9/2007 | Hertz et al. | |
| 2001/0024996 A1 | 9/2001 | Sugano | |
| 2005/0209038 A1 * | 9/2005 | Kempf et al. | 475/159 |
| 2005/0209040 A1 * | 9/2005 | Foster et al. | 475/159 |
| 2006/0226719 A1 * | 10/2006 | Nakanishi et al. | 310/68 B |
| 2006/0243501 A1 * | 11/2006 | Hidaka | 180/65.1 |
| 2007/0081311 A1 * | 4/2007 | Iwamiya et al. | 361/760 |
| 2007/0216240 A1 * | 9/2007 | Kikuchi et al. | 310/68 B |
| 2007/0216242 A1 * | 9/2007 | Tagawa | 310/85 |
| 2008/0024021 A1 | 1/2008 | Tsukashima et al. | |
| 2008/0211356 A1 * | 9/2008 | Kataoka et al. | 310/68 B |
| 2009/0295316 A1 * | 12/2009 | Patel et al. | 318/400.02 |
| 2010/0002972 A1 * | 1/2010 | Ohtsuki et al. | 384/544 |
| 2010/0109491 A1 * | 5/2010 | Miyazaki et al. | 310/68 B |
| 2010/0133961 A1 * | 6/2010 | Shirakata et al. | 310/68 B |
| 2010/0160111 A1 * | 6/2010 | Yamanaka et al. | 477/45 |
| 2011/0120789 A1 * | 5/2011 | Teraya | 180/65.25 |

FOREIGN PATENT DOCUMENTS

| | | |
|---|---|---|
| CN | 1744411 A | 3/2006 |
| CN | 101091302 A | 12/2007 |

(Continued)

*Primary Examiner* — Alex W Mok
(74) *Attorney, Agent, or Firm* — Quinn Law Group, PLLC

(57) ABSTRACT

A hub assembly for an electric machine includes a rotor hub and a machine rotor. Rotation of the machine rotor generates an electromagnetic (EM) field. The hub assembly includes a resolver rotor that encodes an angular position of the machine rotor as a set of resolver signals. An EM field barrier ring between the resolver rotor and the rotor hub adds a magnetic barrier between the machine rotor and the resolver rotor to reduce noise in the resolver signals. The resolver rotor may be bonded to the EM field barrier ring. The EM field barrier ring may have an L-shaped cross section, and may be press-fitted into a pocket of the rotor hub. A vehicle includes a transmission having an input member and an electric machine having a rotor shaft connected to the input member of the transmission. The electric machine includes the hub assembly noted above.

12 Claims, 2 Drawing Sheets

(56) References Cited

FOREIGN PATENT DOCUMENTS

| | | |
|---|---|---|
| CN | 101741179 A | 6/2010 |
| DE | 112006000118 T5 | 12/2007 |
| JP | H0965617 A | 3/1997 |
| JP | 2000036419 A * | 2/2000 |
| JP | 2001191931 A | 7/2001 |

* cited by examiner

ROTOR HUB ASSEMBLY WITH NON-MAGNETIC RESOLVER SHIELDING RING

TECHNICAL FIELD

The present disclosure relates to a non-magnetic resolver shielding ring for use within a rotor hub assembly.

BACKGROUND

Electric machines in the form of motors and/or generators can be used in a wide variety of applications. For instance, in hybrid electric, battery electric, or extended range electric vehicles an electric traction motor may be used to provide output torque to a transmission. The relatively high DC voltage stored in a typical battery module of such vehicles may be reduced to more suitable levels via an auxiliary power module (APM). APM output, typically 12 VDC, may be used to power smaller drive motors throughout the vehicle.

In electric machines of various sizes, a rotor hub assembly may be used to house a rotor. In applications in which motor positional and speed data is required, a motor resolver may be positioned with respect to a rotor hub. The resolver measures and converts the angular position of the rotor into an electrical signal that is useable by a controller. The controller processes the received resolver signals to precisely determine the output torque and relative rotational speed of the motor. Such values may then be used in feedback control of the motor and/or other devices that may be connected to the motor.

SUMMARY

A hub assembly is disclosed herein for use within an electric machine. The hub assembly includes a rotor hub, a motor/machine rotor positioned within the rotor hub, a resolver rotor, and an annular electromagnetic (EM) field barrier, hereinafter referred to as an EM field barrier ring. The EM field barrier ring is positioned between the resolver rotor and the rotor hub. When the electric machine is energized, an electromagnetic field is generated around the machine rotor. The resolver rotor, which is positioned within the electromagnetic field of the machine rotor unlike typical prior art devices, encodes the angular position of the machine rotor as a set of resolver signals. The EM field barrier ring is configured to reduce the direct coupling of the electromagnetic field of the machine rotor from the resolver rotor to thereby reduce noise in the set of resolver signals.

The EM field barrier ring may fully circumscribe the resolver. Additionally, the design of the EM field barrier ring allows the resolver rotor to be directly mounted to the rotor hub. Conventional designs mounted in the same way may generate unacceptable levels of noise in any generated resolver signals, thus necessitating additional and potentially problematic control steps such as signal processing/filtering.

A vehicle is also disclosed herein that includes a transmission and an electric machine. The electric machine includes a rotor shaft that is connected to an input member of the transmission. The electric machine includes the hub assembly described above.

The EM field barrier ring may be constructed of austenitic stainless steel in a particular embodiment. The rotor hub may define a circumferential pocket. The EM field barrier ring may be press-fitted or otherwise disposed within the circumferential pocket. The EM field barrier ring may be optionally bonded to the resolver rotor. For example, the EM field barrier ring may have a generally L-shaped cross-section that is defined by a pair of orthogonally-arranged walls. In such a configuration, the resolver rotor may be bonded to each of the orthogonally-arranged walls.

The above features and advantages and other features and advantages of the present invention are readily apparent from the following detailed description of the best modes for carrying out the invention when taken in connection with the accompanying drawings.

DETAILED DESCRIPTION

Figure 1:
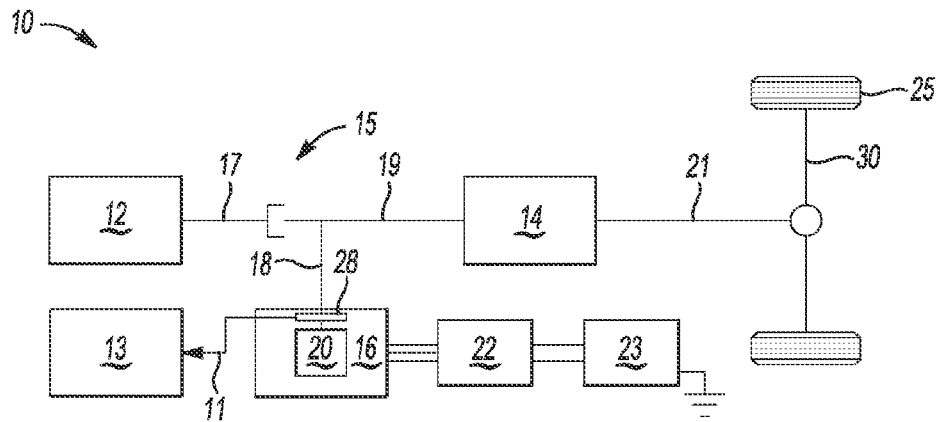
FIG. 1 is a schematic illustration of an example vehicle having a rotor hub assembly with an electromagnetic (EM) field barrier ring as described herein.

Referring to the drawings, wherein like reference numbers correspond to like or similar components throughout the several figures, an example vehicle 10 is shown schematically in FIG. 1. The vehicle 10 may include an electric machine 16, i.e., a motor, generator, or a motor/generator unit. The electric machine 16 includes a hub assembly 20 within which a resolver rotor 28 is used to measure the changing angular position of a motor rotor 26 (see FIG. 2). As is well understood in the art, a resolver has a rotating component (rotor) and a stationary component (stator). The resolver rotor 28 shown in FIG. 2 and discussed below is therefore the particular portion over an overall resolver assembly (not shown) that may be mounted or positioned within the hub assembly 20.

The electric machine 16 also includes an electromagnetic (EM) field barrier ring 29 as described in detail below with reference to FIGS. 2 and 3. The EM field barrier ring 29 effectively adds a magnetic barrier to the rotor field entering into the resolver rotor 28 from any magnetic flux generated with respect to the hub assembly 20 when the electric machine 16 is energized, thereby reducing signal noise or distortion in a set of resolver signals (arrow 11) transmitted by the resolver rotor 28 to a controller 13.

In the example configuration of FIG. 1, the electric machine 16 is embodied as an electric traction motor, and is thus configured to deliver motor output torque to a transmission 14 via a rotor shaft 18. The electric machine 16 may be a multi-phase device that is selectively energized by an energy storage system 23 via a power inverter module 22. As is known in the art, the power inverter module 22 converts DC power from the energy storage system 23 into multi-phase AC power suitable for use by the electric machine 16.

While a vehicle embodiment is described herein with reference to FIG. 1, those of ordinary skill in the art will appreciate that any type of electric machine 16 that can use a hub assembly 20 of the type disclosed herein, and that can use a resolver for control, may benefit from the present shielding approach. Therefore, applications are not limited to the particular vehicle 10 shown in FIG. 1, or even to vehicle applications in general.

When the example vehicle 10 of FIG. 1 is configured as a hybrid electric vehicle, an internal combustion engine 12 may be used deliver torque via a driveshaft 17 to the input member 19 of the transmission 14, either alone or in conjunction with the electric machine 16. Selective connection of the drive shaft 17 and the input member 19 may be affected via operation of an input clutch 15. An output member 21 of the transmission 14 ultimately delivers output torque to one or more drive axles 30, which ultimately power a set of drive wheels 25.

The controller 13 of FIG. 1 may be embodied as a digital computer generally including a CPU. The set of resolver signals (arrow 11) encodes the angular position of a motor rotor 26 (see FIG. 2) within the hub assembly 20. The controller 13 receives the resolver signals (arrow 11) and calculates a motor control value(s) of the electric machine 16, such as rotational speed and/or rotor position, using the information encoded in the received set of resolver signals (arrow 11). The controller 13 has sufficient memory, including for instance read only memory (ROM), random access memory (RAM), electrically-programmable read only memory (EPROM), etc. The controller 13 may include a high-speed clock, analog-to-digital (A/D) and/or digital-to-analog (D/A) circuitry, and input/output (I/O) circuitry and devices, as well as appropriate signal conditioning and buffering circuitry.

The resolver rotor 28 is positioned with respect to the electric machine 16. Due to the use of the EM field barrier ring 29 as described below with reference to FIG. 2, the resolver rotor 28 may be mounted directly to the hub assembly 20. Such placement stands in stark contrast to conventional designs which place a differently configured resolver (not shown) well outside of the hub assembly 20 in order to avoid any interference/noise from an electromagnetic field generated by a rotor used therein.

Figure 2:
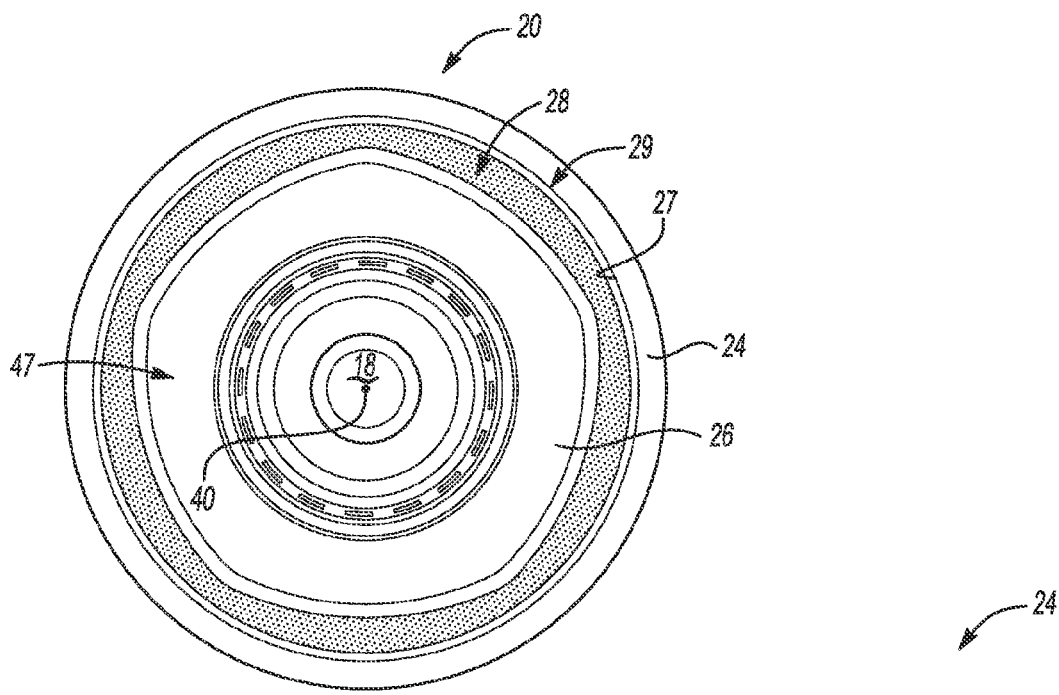
FIG. 2 is a schematic illustration of an example of such a rotor hub assembly.

Referring to FIG. 2, the hub assembly 20 may include a rotor hub 24 that houses the machine rotor 26 noted above. The rotor hub 24 includes an inner circumferential wall 27. The rotor shaft 18 rotates about its axis of rotation 40 in conjunction with the machine rotor 26 when the electric machine 16 of FIG. 1 is energized. The rotor hub 24 may be constructed of carbon steel or another magnetic/at least partially ferrous material.

The EM field barrier ring 29 may be positioned between the rotor hub 24 and the resolver rotor 28. The shielding ring 29 may fully circumscribe the resolver rotor 28 within the hub assembly 20, thus ensuring magnetic isolation of the resolver rotor 28 from the electromagnetic field of the motor rotor 26. Use of the EM field barrier ring 29 may help minimize the amount of signal distortion or noise in the set of resolver signals (arrow 11 of FIG. 1). Noise reduction is described in further detail below with reference to FIGS. 4 and 5. Additionally, use of the EM field barrier ring 29 allows the resolver rotor 28 to be directly mounted to the rotor hub 24 as noted above.

The EM field barrier ring 29 shown in FIG. 2 may be constructed of any non-magnetic material to add strong reluctance to the magnetic field. In a particular embodiment, the EM field barrier ring 29 may be constructed of austenitic stainless steel. Examples of such steel include stainless steel types 302, 303, 304, and 316L. In other embodiments, brass, copper, nickel, or aluminum may be used in lieu of stainless steel, as well as alloys of these or other suitable non-magnetic materials. As used herein, the term "non-magnetic material" describes materials having a relative magnetic permeability between 1 and 5, with values of between 1 and 1.5 being ideal.

Figure 2A:
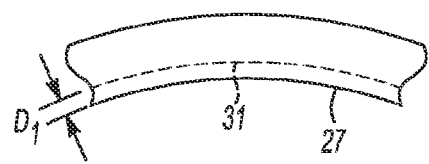
FIG. 2A is a schematic illustration of a portion of the hub assembly shown in FIG. 2 that illustrates a circumferential pocket for placement of the EM field barrier ring.

Referring to FIG. 2A, a portion of the rotor hub 24 is shown to illustrate one possible approach to seating of the EM field barrier ring 29 of FIG. 2. In order to enable press-fitting or bonding of the EM field barrier ring 29 to the rotor hub 24 of FIG. 2, the rotor hub 24 may have to be modified to receive the EM field barrier ring 29. For instance, a circumferential pocket 31 having a depth ($D_1$) as shown in phantom in FIG. 2A may be routed or machined into an inner circumferential wall 27 of the rotor hub 24.

In an example manufacturing process, the rotor hub 24 may be machined or routed to form the circumferential pocket 31 e.g., by 2 mm in both the radial and axial directions. Thereafter, the EM field barrier ring 29 may be inserted into the circumferential pocket 31. The resolver rotor 28 may then be inserted into the EM field barrier ring 29 as shown in FIG. 3, and optionally bonded to the EM field barrier ring 29 using a suitable adhesive. Suitable high-strength adhesives would have, for instance, medium-to-low viscosity, anaerobic heat curing, and good resistance to the levels of heat, shock, and vibration ordinarily experienced in a vehicle transmission or electric motor.

Figure 3:
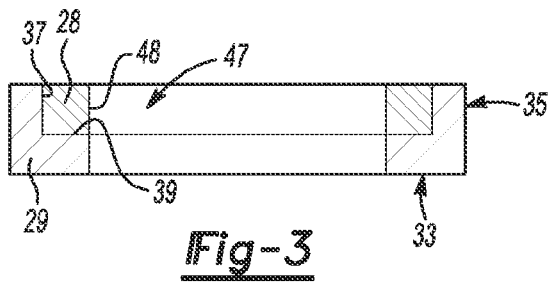
FIG. 3 is a schematic cross-sectional view of an example resolver and EM field barrier ring configuration.

Referring to FIG. 3, the EM field barrier ring 29 may have a generally L-shaped cross-section in one possible configuration, including a first wall 37 and a second wall 39. The side walls 37 and 39 may be arranged orthogonally with respect to each other as shown, with the resolver rotor 28 bonded to each of the side walls 37 and 39 and is co-extensive with the orthogonally-arranged side walls 37 and 39. The EM field barrier ring 29 and a radially-inwardmost surface 48 of the resolver rotor 28 are spaced apart from the rotor shaft 18 by a gap arrow 47). A lower surface 33 and an outer surface 35 of the EM field barrier ring 29 ultimately rests against the rotor hub 24 shown in FIGS. 2 and 2A, i.e., within the circumferential pocket 31 of FIG. 2A. Because the EM field barrier ring 29 fully circumscribes the resolver rotor 28, the material of the EM field barrier ring 29 is always disposed between the resolver rotor 28 and the rotor hub 24 of FIGS. 2 and 2A. In this manner, the EM field barrier ring 29 effectively reduces the amount of signal distortion in any generated set of resolver signals (arrow 11 of FIG. 1).

Figure 4:
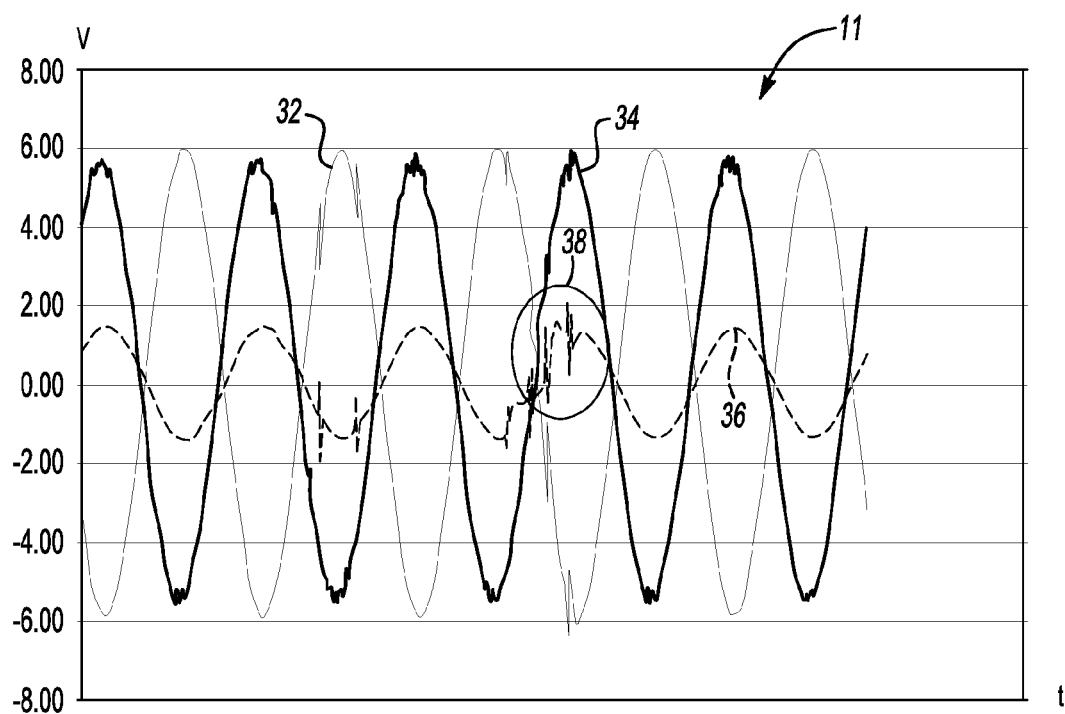
FIG. 4 is a graph describing a baseline time plot of example resolver voltage signals.
Figure 5:
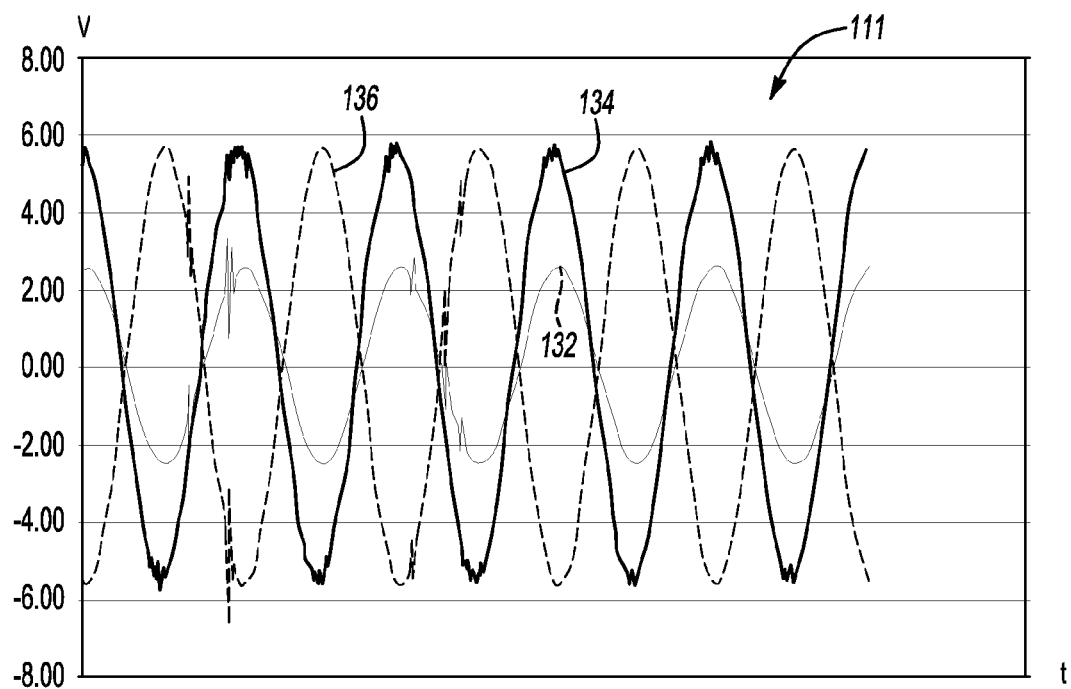
FIG. 5 is a graph describing another baseline time plot of example resolver voltage signals that may be generated with the EM field barrier ring in place within the hub assembly of FIG. 2.

Example sets of resolver signals 11 and 111 are shown in FIGS. 4 and 5, respectively. The vertical axis indicates the voltage level (V), while the horizontal axis indicates time (t). The set of resolver signals 11 of FIG. 4 includes traces 32 and 36, which respectively represent the sine and cosine values. Trace 34 represents the excitation signal. Absent use of the EM field barrier ring 29 of FIGS. 2 and 3, noise may result in the received set of resolver signals 11. For instance, substantial noise may result in trace 36 (cosine) as indicated by area 38. The set of resolver signals 111 of FIG. 5, with traces 132, 134, and 136 corresponding to a later measurement of the respective traces 32, 34, and 36 of FIG. 4, has a pronounced reduction in signal noise, a result that is readily achievable using the design and approach set forth in detail hereinabove.

While the best modes for carrying out the invention have been described in detail, those familiar with the art to which this invention relates will recognize various alternative designs and embodiments for practicing the invention within the scope of the appended claims.

The invention claimed is:
1. A hub assembly comprising:
  a rotor hub having an inner circumferential wall;
  a machine rotor positioned within the rotor hub, wherein an electromagnetic field is generated with respect to the machine rotor when the machine rotor is energized and rotated about an axis of rotation of a rotor shaft;

a resolver rotor positioned within the electromagnetic field of the machine rotor and spaced apart from the rotor shaft, wherein the resolver rotor is configured to encode an angular position of the machine rotor as a set of resolver signals; and a non-magnetic electromagnetic (EM) field barrier ring having orthogonally-arranged side walls, positioned between the resolver rotor and the rotor hub, and fully circumscribing the resolver rotor, wherein the EM field barrier ring is press-fitted or bonded to the inner circumferential wall of the rotor hub, and the resolver rotor is bonded to and co-extensive with each of the orthogonally-arranged side walls;

wherein the EM field barrier ring forms a magnetic barrier between the electromagnetic field of the machine rotor and the resolver rotor to thereby reduce noise in the set of resolver signals.

2. The hub assembly of claim 1, wherein the EM field barrier ring is constructed of austenitic stainless steel.

3. The hub assembly of claim 1, wherein the rotor hub defines a circumferential pocket, and wherein the EM field barrier ring is positioned at least partially within the circumferential pocket.

4. The hub assembly of claim 1, wherein the EM field barrier ring is bonded to the resolver rotor.

5. The hub assembly of claim 1, wherein the rotor shaft is a motor output shaft of an electric traction motor for a vehicle.

6. A vehicle comprising:
a transmission having an input member;
a rotor shaft connected to the input member of the transmission; and
a hub assembly that includes:
a rotor hub having an inner circumferential wall;
a machine rotor positioned within the rotor hub, wherein the machine rotor is a rotating portion of an electric machine used aboard the vehicle, and is rotated about an axis of rotation of a rotor shaft of the electric machine;
a resolver rotor positioned within an electromagnetic field of the machine rotor, wherein the resolver rotor is configured to encode an angular position of the machine rotor as a set of resolver signals, wherein the resolver rotor is spaced apart from the rotor shaft; and
a non-magnetic electromagnetic (EM) field barrier ring having orthogonally-arranged side walls, positioned between the resolver rotor and the rotor hub, and fully circumscribing the resolver rotor, wherein the EM field barrier ring is press-fitted or bonded to the inner circumferential wall of the rotor hub and the resolver rotor is bonded to and co-extensive with each of the orthogonally-arranged side walls;

wherein the EM field barrier ring forms a magnetic barrier between the electromagnetic field of the machine rotor and the resolver rotor to thereby reduce noise in the set of resolver signals.

7. The vehicle of claim 6, further comprising a controller in communication with the resolver rotor, wherein the controller is configured to receive the set of resolver signals from the resolver rotor and calculate a control value of the electric machine using the received set of resolver signals.

8. The vehicle of claim 6, wherein the EM field barrier ring is constructed of austenitic stainless steel.

9. The vehicle of claim 6, wherein the hub defines a circumferential pocket, and wherein the EM field barrier ring is positioned at least partially within the circumferential pocket.

10. The vehicle of claim 6, wherein the EM field barrier ring is bonded to the resolver rotor.

11. A hub assembly comprising:
a rotor hub constructed of carbon steel and having an inner circumferential wall;
a machine rotor of an electric traction motor, wherein the machine rotor is positioned within the rotor hub, and wherein a rotation of the machine rotor about an axis of rotation of a rotor shaft of the electric traction motor generates an electromagnetic (EM) field;
a resolver rotor positioned within the EM field of the machine rotor, wherein the resolver rotor is configured to generate a set of resolver signals that encodes an angular position of the machine rotor, and wherein the resolver rotor is spaced apart from the rotor shaft by a gap; and
a non-magnetic EM field barrier ring constructed of austenitic stainless steel, wherein the EM field barrier ring has orthogonally-arranged side walls, and is press-fitted or bonded to the inner circumferential wall of the rotor hub between the resolver rotor and the rotor hub such that the EM field barrier ring fully circumscribes the resolver rotor, and such that the resolver rotor is bonded to and co-extensive with each of the orthogonally-arranged side walls;

wherein the EM field barrier ring is bonded to the resolver rotor and magnetically isolates the resolver rotor from the EM field of the machine rotor to thereby reduce noise in the resolver signals.

12. The hub assembly of claim 11, wherein the rotor hub defines a circumferential pocket, and wherein the EM field barrier ring is press-fitted to the inner circumferential wall within the circumferential pocket.

* * * * *